United States Patent
Sanchez et al.

[11] Patent Number: 6,015,615
[45] Date of Patent: Jan. 18, 2000

[54] MATTE FINISH RELEASE COMPOSITION, LINERLESS LABELS INCORPORATING THE RELEASE COMPOSITION AND METHOD FOR MAKING SAME

[75] Inventors: Michael Sanchez, Grand Island; Khaled M. Khatib, Youngstown; David K. Rice, II, Tonawanda, all of N.Y.

[73] Assignee: Moore Business Forms, Inc., Grand Island, N.Y.

[21] Appl. No.: 08/858,375

[22] Filed: May 19, 1997

Related U.S. Application Data

[62] Division of application No. 08/476,868, Jun. 7, 1995.

[51] Int. Cl.[7] ................................................. B32B 7/12
[52] U.S. Cl. ..................... 428/352; 428/41.8; 428/327; 428/422; 428/447
[58] Field of Search ..................... 428/352, 447, 428/327, 422, 354, 41.8, 906, 195

[56] References Cited

U.S. PATENT DOCUMENTS

| | | |
|---|---|---|
| 4,626,256 | 12/1986 | Kawasaki et al. |
| 4,898,849 | 2/1990 | Kang ........................ 503/214 |
| 5,462,911 | 10/1995 | Takao et al. ............... 503/227 |
| 5,658,661 | 8/1997 | Mitchell, Jr. et al. ..................... 428/352 |
| 5,705,451 | 1/1998 | Takao et al. ............................ 503/227 |

*Primary Examiner*—Daniel Zirker
*Attorney, Agent, or Firm*—Finnegan Henderson Farabow Garrett & Dunner

[57] ABSTRACT

A silicone release composition having a non-gloss, i.e., matte finished, surface and a linerless label incorporating the silicone release composition. The release composition includes a crosslinked silicone-based polymer having microparticles of a polymeric wax at least partially embedded therein. The polymeric wax may be polytetrafluoroethylene, polypropylene or other polyolefin, or a hydrocarbon-based wax. The microparticles of polymeric wax cause incidental light to scatter upon reflection, giving the release composition surface matte appearance. This makes the release composition particularly useful for linerless labels on which bar coded information will be printed. Also, a method for producing linerless label stock. The method includes mixing an uncured silicone material with microparticles of a polymeric wax. The mixture is coated onto a substrate and exposed to UV radiation to cure or crosslink the silicone around the microparticles of wax. An adhesive is coated onto the side of the substrate opposite the silicone release composition and the coated substrate is wound into a roll of linerless label stock.

23 Claims, 1 Drawing Sheet

MATTE FINISH RELEASE COMPOSITION, LINERLESS LABELS INCORPORATING THE RELEASE COMPOSITION AND METHOD FOR MAKING SAME

This is a division of application Ser. No. 08/476,868, filed Jun. 7, 1995.

BACKGROUND OF THE INVENTION

1. Field of the Invention

The present invention relates to linerless labels, and more particularly to linerless labels incorporating a non-gloss, i.e., matte finished, silicone release composition.

2. Description of Related Art

Linerless labels are typically manufactured by applying a permanent, removable or repositionable pressure sensitive adhesive onto one side of a paper or synthetic continuous substrate or web and applying a release coating to the opposite side of the substrate. The resultant article is then wound upon itself to form a roll. The presence of a release coating on the side of the substrate opposite the adhesive allows the article to be rolled up and then subsequently unrolled, without the adhesive sticking to the substrate. Linerless labels obviate the need for a separate release sheet or liner that must be stripped from the adhesive layer and discarded prior to applying the adhesive substrate to the intended surface. Such liners are inconvenient, costly and often constitute an environmental problem.

The ability to print bar coded information onto labels is often desirable. Standard release coatings used in the linerless label field to produce self-wound direct thermal linerless labels give the imaging (i.e., release) side of the labels a glossy appearance. Under certain ambient lighting conditions, glare from these standard release coatings has a tendency to interfere with the ability of scanning equipment to decode the information stored in bar code images that is thermally printed on the label face.

SUMMARY OF THE INVENTION

Accordingly, the present invention is directed to a silicone release composition, a linerless label incorporating the silicone release composition, and a method for producing a linerless label that substantially obviate one or more of the problems due to limitations and disadvantages of the related art.

To achieve the advantages and in accordance with the purpose of the invention, as embodied and broadly described herein, the invention includes in one embodiment a silicone release composition having a non-gloss, i.e., matte-finished, surface. This release composition includes a crosslinked silicone-based polymer having microparticles of a polymeric wax at least partially embedded therein.

In another aspect, the invention includes a linerless label having a substrate, a silicone release layer disposed on the front side of the substrate, and an adhesive layer disposed on the back side of the substrate. The release layer includes the aforementioned crosslinked silicone-based polymer having microparticles of a polymeric wax at least partially embedded therein.

In a further aspect, the invention includes a method for producing linerless label stock. The method involves mixing an uncured silicone material with microparticles of a polymeric wax. This mixture is coated onto the front side of a substrate. The coated substrate is exposed to UV radiation to crosslink the silicone around the microparticles of polymeric wax. An adhesive material is-coated onto the back side of the substrate. The coated substrate is wound into a roll of linerless label stock.

In a preferred embodiment of the invention, the substrate on which the adhesive material and the release composition is coated is a direct thermal paper, and the label is a linerless direct thermal label.

It is to be understood that both the foregoing general description and the following detailed description are exemplary and explanatory only and are not restrictive of the invention, as claimed.

Additional advantages of the invention will be set forth in part in the description which follows, and in part will be obvious from the description, or may be learned by practice of the invention. The advantages of the invention will be realized and attained by means of the elements and combinations particularly, pointed out in the appended claims.

The accompanying drawing is included to provide a further understanding of the invention and is incorporated in and constitutes a part-of this specification, illustrates one embodiment of the invention and together with the description serves to explain the principles of the invention.

DETAILED DESCRIPTION OF THE INVENTION

Figure 1:
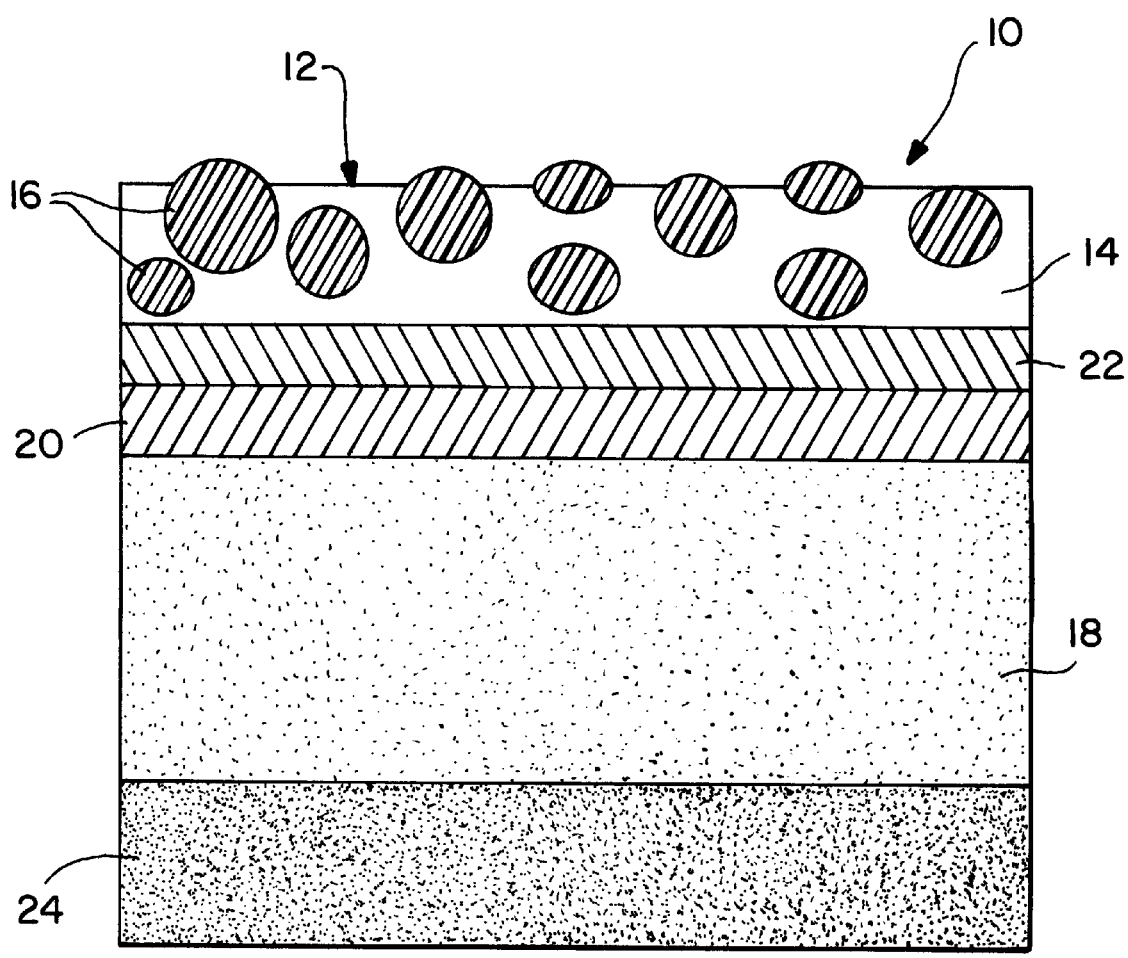
FIG. 1 is a cross-sectional view showing a construction of one embodiment of a linerless label of the present invention.

In accordance with the invention, as embodied and broadly described herein, a silicone release composition is provided. The release composition includes a crosslinked silicone-based polymer having microparticles of a polymeric wax at least partially embedded therein. The microparticles of polymeric wax cause incidental light to scatter upon reflection, giving the surface of the release composition a "matte" finish. As a result, the release composition of the invention is useful for labels on which bar coded information will be printed.

In accordance with the invention, the silicone-based polymer is preferably an epoxy-based UV-curable silicone. An example of such a polymer is an epoxy silicone resin having the formula I:

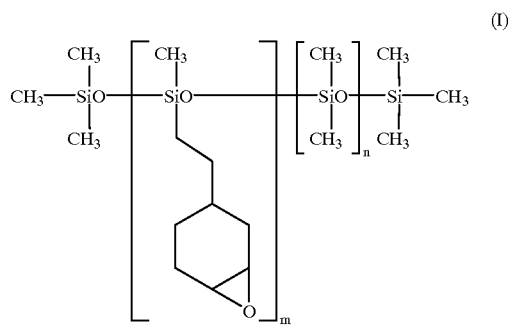

(I)

In formula I, the functionality of the silicone polymer (as described by m and n) is proprietary. However, it is known that the epoxy silicone compound is a short chain polymer with a high degree of functionality. As such, it provides both easy release and effective anchorage to paper and film substrates. Crosslinking (i.e., curing) of the above silicone polymer can be accomplished by adding 2.5 parts by weight of a photoinitiator to the total formulation and irradiating with ultraviolet light of frequency 240–320 nm. Both the silicone and photoinitiator compounds are available from General Electric Corporation of Waterford, N.Y. under the trade names UV9300 (silicone) and UV 9380 C-D1 (initiator).

Another example of an epoxy-based silicone that can be used in accordance with the invention is the following compound of formula II:

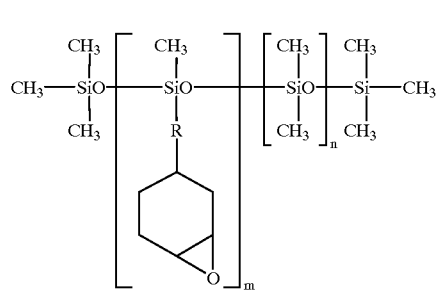

(II)

where R is an organic functional chain of fixed length. R, m and n are proprietary. Five parts by weight of the total solution can be added to crosslink the silicone chains. This presently experimental silicone system will be manufactured by Rhone-Poulenc under the trade names PC 600 (silicone) and PC 700 (photoinitiator).

In accordance with the invention, the silicone-based polymer can also be, for example, an acrylated polysiloxane. One example of such an acrylated polysiloxane is a mixture of (a) about 55 to about 95 parts by weight of a first acrylated polysiloxane having the formula III:

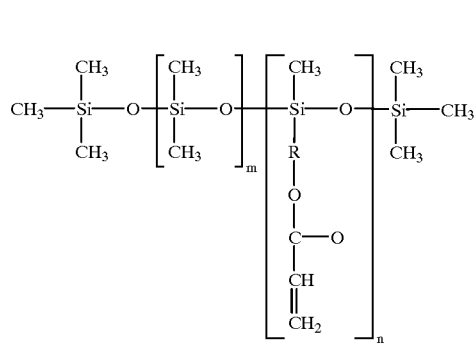

(III)

wherein m is about 40 and n ranges from about 8 to about 12; (b) about 5 to about 45 parts by weight of a second acrylated polysiloxane having the formula IV:

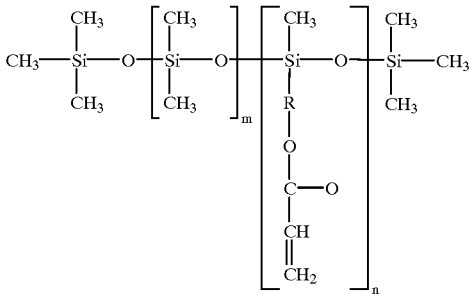

(IV)

wherein m is about 180 and n ranges from about 8 to about 12; and. (c) about 2 to about 6 parts by weight of a photoinitiator. The acrylate units in each of the polysiloxane compounds are randomly distributed throughout the polymer.

The acrylated polysiloxane of (a) is a relatively short chain polymer with high functionality. This material serves as a "tight" release and, because of its high density inter- and intrachain crosslinking, provides enhanced anchorage to the substrate. This composition is available from Goldschmidt Chemical Corp. of Hopewell, Va. under the trade name TEGO® Silicone Acrylate RC 711. The acrylated polysiloxane of (b) has a relatively high molecular weight and provides excellent release properties. This composition is also available from Goldschmidt Chemical Corp. of Hopewell, Va., under the trade name TEGO® Silicone Acrylate RC 726.

Epoxy-based UV-curable silicones are preferred for use in the present invention over acrylic-based polysiloxanes because the epoxy-based silicones, when mixed with the microparticles of wax, have a lower viscosity, on the order of about 3000 cp. This allows these solutions to be more easily pumped, applied by coating, etc.

In accordance with the invention, moist air curable silicones could also be used. An example of such a silicone would be an alkoxy-functional polydimethylsiloxane system available from Dow Corning Corporation under the trade name X2-8100 PTC (silicone) and RTC (titanate catalyst). Thermally-cured silicones could also be used provided that the temperature of curing does not exceed 160° F.

In accordance with the invention, the microparticles of polymeric wax can be selected from polytetrafluoroethylene (PTFE), polyolefins (such as polypropylene) and synthetic long-chain hydrocarbons. PTFE is the preferred material, since it has the lowest surface energy and lowest coefficient of friction of any micronized wax available. These properties are important because the low surface energy of PTFE gives labels sufficient release, and the low coefficient of friction allows the label to pass easily across a thermal printhead. Micronized PTFE wax is available from several suppliers, including Astor Wax Corporation of Doraville, Ga., Ausimont-USA of Morristown, N.J., and Micro Powders, Inc. (MPI) of Tarrytown, N.Y. Polyolefin and hydrocarbon waxes can also be obtained from MPI. The preferred mean particle size for each of these types of microparticles ranges from about 2.0 to about 8.0 microns in diameter.

In accordance with the invention, the polymeric wax microparticles can be present in the epoxy-based silicone release composition in amounts up to about 35% by weight relative to the total amount of silicone and wax. In acrylic-based silicones, waxes can be present in amounts up to about 25% by total weight. The percentages of wax in solution are limited by solution viscosity. At percentages exceeding these amounts, viscosity increases to the point where coating becomes impractical due to the presence of blotches, streaks, and voids in the cured silicone coating. Because acrylic-based silicones have higher viscosities than epoxy-based systems before and after mixing with wax, the preferred maximum wax percentage for acrylic silicones is less than for epoxy silicones.

In accordance with the invention, the silicone release composition of the invention is advantageously used in a linerless label. The silicone release composition can be coated on the front side of a substrate, which can be paper or the like. An adhesive layer is coated on the back side of the substrate. In a preferred embodiment of the invention, the substrate can be direct thermal paper. Thermal paper can include, for example, a base paper on its back side, a barrier layer on its front side, and a direct thermal layer interposed therebetween. This preferred embodiment of the invention is illustrated in FIG. 1.

As embodied in FIG. 1, a direct thermal linerless label 10 of the invention is illustrated. Label 10 includes a silicone release layer 12 as previously described comprised of a crosslinked silicone-based polymer 14 having polymeric wax microparticles 16 at least partially embedded therein. At least some of polymeric wax microparticles 16 should be exposed from the surface of silicone release layer 12 to give the surface a matte finish to effectively scatter light and reduce gloss. If all of polymeric wax microparticles 16 are completely embedded within crosslinked silicone-based polymer 14, a flat surface will result, which surface will tend to reflect light like a mirror. Silicone release layer 12 preferably ranges from about 1 to about 2 microns in thickness. At thicknesses exceeding about 2 microns, silicone release layer 12 may undesirably insulate the direct thermal layer of the label from the heat from the thermal print head.

As embodied by FIG. 1, a base paper 18 is provided, which can be, for example, paper and the like. A direct thermal layer 20 is located adjacent base paper 18. Direct thermal layer 20 can be any suitable composition such as a leuco or metallic dye system capable of forming color patterns in response to a heated printing head. A barrier layer 22 is sandwiched between direct thermal layer 20 and silicone release layer 12. Barrier layer 18 protects direct thermal layer 20 from direct contact with silicone release layer 12, thereby preventing unwanted color formation in direct thermal layer 20. Barrier layer 18 can be, for example, a water soluble resin such as polyvinyl alcohol.

In accordance with the invention, base paper 18, direct thermal layer 20, and barrier layer 22 can be provided as an assembled thermal paper. An example of such an assembled thermal paper is TT9118 from Nashua Corporation of Merrimack, N.H. Other examples include T1062A, T0972A and T09001R grades available from Appleton Papers, Inc. of Appleton, Wis. Referring to FIG. 1, an adhesive layer 24 is provided on the back side of base paper 18. Any suitable pressure sensitive adhesive may be used as adhesive layer 24. Examples of suitable adhesives include permanent hot melt adhesives such as Duro-Tak 34-4144 from National Starch and Chemical of Bridgewater, N.J., as well as repositionable acrylic-based adhesives such as CleanTac from Moore Pressure Sensitive Systems of Buffalo, N.Y. Removable type adhesives known in the art could also be used in the invention.

In accordance with the invention, silicone release compositions containing microparticles of PTFE may be more suitable for use with permanent hot melt adhesives than release compositions containing micronized polyolefins or hydrocarbons. However, both the PTFE and the polyolefin and hydrocarbon-based waxes may be advantageously used with repositionable acrylic-based adhesives.

A specific application for the linerless labels of the invention is for systems that use video-type scanners. Video-type scanners use a videocamera to record an image of the printed bar code and a computer to process the image into usable numeric code. One example is the scanner used at United States Postal Service sites. When mounted on packages at an angle greater than 10° away from the imaginary plane perpendicular to the scanner, glare from overhead lighting can make bar codes printed on standard labels unreadable. The release compositions of the invention have a matte finish and thus help to overcome this problem.

In accordance with the invention, a method is provided for producing linerless label stock. The method involves mixing an uncured silicone material with microparticles of a polymeric wax. The mixing can be carried out by, for example, mechanical means. The mixture is then coated onto one side of a substrate by coating means known in the art, such as flexographic, meyer rod, and the like. After coating, the substrate is exposed to UV radiation at wavelengths preferably ranging from 240 to 320 nm. to crosslink (i.e., cure) the silicone around the polymeric microparticles. An adhesive material as discussed previously herein is coated onto the back side of the substrate using coating means known in the art. The coated substrate can then be wound into a roll to form linerless label stock.

The following typical example further illustrates advantageous features of the present invention and is illustrative of the various features of the invention.

EXAMPLE

A typical linerless direct thermal label is produced by preparing a 70/30 mixture, by weight, of GE UV9300 epoxy-based UV curable silicone and Peflu 727 FS PTFE wax microparticles from Astor Wax Corporation, Astor-Stag Div. having a mean particle diameter of 5–8 microns. The mixture is release coated onto the front side of Nashua TT9118 direct thermal paper in a coating weight of 1.5 g/m$^2$ using a 360 LPI ceramic anilox roll at a press line speed of 150 feet per minute. The silicone/wax mixture is then cured (crosslinked) by exposing the paper to UV radiation having a wavelength of 240–320 nm in a nitrogen atmosphere. National Starch Duro-Tak 34-4144 adhesive is then applied to the back side of the paper by heated extrusion through a slot die in a coating weight of 16.9 g/m$^2$. The paper is then rewound to create linerless labels.

It will be apparent to those skilled in the art that various modifications and variations can be made to the present invention and in construction of this invention without departing from the scope or spirit of the invention. Other embodiments of the invention will be apparent to those skilled in the art from consideration of the specification and practice of the invention disclosed herein. It is intended that the specification and drawing be considered as exemplary only, with a true scope and spirit of the invention being indicated by the following claims.

What is claimed is:

1. A linerless label comprising:

a substrate having front and back sides;

a silicon release layer disposed on the front side of said substrate, said release layer including a crosslinked silicon polymer having microparticles of a polymeric wax at least partially embedded therein, wherein at least some of said microparticles are exposed from the surface of said layer a distance sufficient to cause incidental light to scatter upon reflection giving the layer a matte finish, and wherein the composition of said release layer is selected to enable the layer to effectively function as a release for a pressure sensitive adhesive; and a pressure sensitive adhesive layer disposed on the back side of said substrate.

2. The label of claim 1, wherein said substrate is direct thermal paper comprising a base paper on its back side, a barrier layer on its front side, and a direct thermal layer interposed therebetween, and said linerless label is a direct thermal linerless label.

3. The label of claim 2, wherein said barrier layer is comprised of polyvinyl alcohol.

4. The label of claim 1, wherein said silicone release layer ranges from about 1 to about 2 microns in thickness.

5. The label of claim 1, wherein said crosslinked silicone polymer is a UV-curable epoxy silicone.

6. The label of claim 5, wherein the polymeric wax microparticles in said silicone release layer are comprised of polytetrafluoroethylene.

7. The label of claim 6, wherein said adhesive is a hot melt permanent adhesive.

8. The label of claim 6, wherein said adhesive is a repositionable acrylic based adhesive.

9. The label of claim 1, wherein the polymeric wax microparticles in said silicone release layer are comprised of a polyolefin.

10. The label of claim 9, wherein said adhesive is a repositionable acrylic based adhesive.

11. The label of claim 10, wherein the polymeric wax microparticles in said silicone release layer are comprised of polypropylene.

12. The label of claim 1, wherein the polymeric wax microparticles in said silicone release layer are comprised of a hydrocarbon wax.

13. The label of claim 12, wherein said adhesive is a repositionable acrylic based adhesive.

14. The label of claim 10, wherein the polymeric wax microparticles in said silicone release layer are comprised of polyethylene.

15. A silicone release for a linerless pressure sensitive adhesive label comprising:

a layer of a crosslinked silicone polymer disposed on a substrate, said crosslinked silicone polymer having microparticles of a polymeric wax at least partially embedded therein, wherein at least some of said microparticles are exposed from the surface of said layer a distance sufficient to cause incidental light to scatter upon reflection giving the layer a matte finish, and wherein the composition of said release is selected to enable it to effectively function as a release for a pressure sensitive adhesive.

16. The release of claim 15, wherein the polymeric wax microparticles are comprised of polytetrafluoroethylene.

17. The release of claim 16, wherein said microparticles have a mean diameter ranging from about 2.0 to about 8.0 microns.

18. The release of claim 16, wherein said crosslinked silicone polymer is a UV-curable epoxy silicone.

19. The release of claim 18, wherein said polytetrafluoroethylene microparticles are present in an amount up to about 35% by weight relative to the total weight of silicone polymer and polytetrafluoroethylene.

20. The release of claim 15, wherein the polymeric wax microparticles are comprised of a polyolefin.

21. The release of claim 20, wherein the polymeric wax microparticles are comprised of polypropylene.

22. The release of claim 20, wherein the polymeric wax microparticles are comprised of polyethylene.

23. The release of claim 15, wherein the polymeric wax microparticles are comprised of a hydrocarbon wax.

* * * * *